US012656631B2

(12) United States Patent
Matsuoka

(10) Patent No.: US 12,656,631 B2
(45) Date of Patent: Jun. 16, 2026

(54) EYEGLASS LENS

(71) Applicant: HOYA LENS THAILAND LTD.,
Pathumthani (TH)

(72) Inventor: Shohei Matsuoka, Tokyo (JP)

(73) Assignee: HOYA LENS THAILAND LTD.,
Pathumthani (TH)

( * ) Notice: Subject to any disclaimer, the term of this
patent is extended or adjusted under 35
U.S.C. 154(b) by 756 days.

(21) Appl. No.: 17/911,988

(22) PCT Filed: Jan. 15, 2021

(86) PCT No.: PCT/JP2021/001346
§ 371 (c)(1),
(2) Date: Sep. 15, 2022

(87) PCT Pub. No.: WO2021/186873
PCT Pub. Date: Sep. 23, 2021

(65) Prior Publication Data
US 2023/0129377 A1 Apr. 27, 2023

(30) Foreign Application Priority Data

Mar. 17, 2020 (JP) ................................. 2020-046050
Mar. 30, 2020 (JP) ................................. 2020-059566

(51) Int. Cl.
*G02C 7/02* (2006.01)
*G02C 7/06* (2006.01)
(52) U.S. Cl.
CPC .............. *G02C 7/06* (2013.01); *G02C 7/024*
(2013.01)

(58) Field of Classification Search
CPC .......... G02C 7/06; G02C 7/024; G02C 7/022;
G02C 2202/24
See application file for complete search history.

(56) References Cited

U.S. PATENT DOCUMENTS

| | | | |
|---|---|---|---|
| 2010/0060949 A1 | 3/2010 | Kurigata | |
| 2012/0257278 A1 | 10/2012 | Simonov et al. | |
| 2016/0377884 A1 | 12/2016 | Lau et al. | |
| 2017/0131567 A1 | 5/2017 | To et al. | |
| 2018/0275427 A1 | 9/2018 | Lau et al. | |
| 2019/0227342 A1 | 7/2019 | Brennan et al. | |
| 2021/0048689 A1* | 2/2021 | Guillot ..................... | G02B 3/04 |
| 2021/0055573 A1* | 2/2021 | Back ........................ | G02C 7/06 |

(Continued)

FOREIGN PATENT DOCUMENTS

| | | |
|---|---|---|
| JP | 2010061565 A | 3/2010 |
| JP | 2012093522 A | 5/2012 |

(Continued)

OTHER PUBLICATIONS

Machine translation of WO-2020004551-A1 (Year: 2020).*

(Continued)

*Primary Examiner* — Matthew Y Lee
(74) *Attorney, Agent, or Firm* — Oliff PLC

(57) ABSTRACT
Provided is an eyeglass lens including: a first region formed
such that light transmitted therethrough is focused at a
predetermined position in an eye; and a plurality of second
regions formed such that light transmitted therethrough is
focused at a position defocused from the predetermined
position, wherein the plurality of second regions have nega-
tive spherical aberration.

14 Claims, 6 Drawing Sheets

(56) References Cited

U.S. PATENT DOCUMENTS

| | | | |
|---|---|---|---|
| 2021/0278699 A1 | 9/2021 | Qi et al. | |
| 2022/0035179 A1* | 2/2022 | Rappon | G02C 7/061 |
| 2022/0350169 A1* | 11/2022 | Sankaridurg | G02C 7/042 |
| 2024/0151989 A1* | 5/2024 | Zhou | A45C 11/04 |

FOREIGN PATENT DOCUMENTS

| | | | | |
|---|---|---|---|---|
| JP | 2013501962 A | 1/2013 | | |
| JP | 2017010031 A | 1/2017 | | |
| JP | 2019128599 A | 8/2019 | | |
| JP | 2019211772 A | 12/2019 | | |
| WO | 96/16621 A1 | 6/1996 | | |
| WO | 2019166653 A1 | 9/2019 | | |
| WO | WO-2020004551 A1 * | 1/2020 | | G02B 1/11 |
| WO | 2020261213 A1 | 12/2020 | | |

OTHER PUBLICATIONS

PCT/JP2021/001346, "International Preliminary Report on Patentability", Sep. 29, 2022, 7 pages.
EP21771828.7, "Extended European Search Report", Apr. 12, 2024, 11 Pages.
PCT/JP2021/001346, "English Translation of International Search Report", Mar. 2, 2021, 3 pages.

* cited by examiner

+3.4D
(Segment's focus)

+1.7D 0D
(Base's focus)

(a)    (b)    (c)    (d)    (e)

EYEGLASS LENS

CROSS-REFERENCE TO RELATED APPLICATIONS

This application is the National Stage of International Application No. PCT/JP2021/001346, filed Jan. 15, 2021, which claims priority to Japanese Patent Application No. 2020-046050, filed Mar. 17, 2020, and Japanese Patent Application No. 2020-059566, filed Mar. 30, 2020, and the contents of which are incorporated by reference.

TECHNICAL FIELD

The present disclosure relates to an eyeglass lens.

BACKGROUND ART

In recent years, the number of people with myopia has been on the rise. It has been reported that myopia progression is accelerated when some of the light that enters an eyeball forms an image behind the retina, while it is suppressed when some of the light forms an image in front of the retina.

For this reason, there are eyeglass lenses for suppressing the progression of a refractive error such as myopia, that include a first region formed such that light transmitted therethrough is focused at a predetermined position (e.g., a position on the retina of an eyeball) and a second region formed such that light transmitted therethrough is focused at a position different from the predetermined position (e.g., a position that is not on the retina of the eyeball). Specifically, there are eyeglass lenses in which a convex face serving as the first region that is an object-side face includes a plurality of convex regions serving as the second regions, the convex regions each having a curved face different from the convex face and projecting from the convex face (see Patent Document 1, for example).

According to eyeglass lenses with this configuration, although a ray that enters the lens from an object-side face and exits from an eyeball-side face is focused on a retina of a wearer in principle, a ray that passes through the convex regions is focused at a position that is closer to an object than the retina is. That is to say, the approach taken is to reduce the amount of light that forms an image behind the retina and increase the amount of light that forms an image in front of the retina, thereby suppressing the myopia progression.

CITATION LIST

Patent Document

Patent Document 1: U.S. Patent Application Publication No. 2017/0131567

SUMMARY OF DISCLOSURE

Technical Problem

Light that enters an eyeball is perceived not only in a central visual field corresponding to a portion including the fovea of the retina but also in a peripheral visual field outside the central visual field.

It is known that, however, when perceiving light that enters an eyeball, the central visual field is more sensitive to light-dark patterns with high spatial frequency, while the peripheral visual field is more sensitive to light-dark patterns with low spatial frequency. That is to say, the peripheral visual field has a spatial resolution lower than that of the central visual field, and light stimuli that are used as cues to locate the focal point are perceived differently in the peripheral visual field from in the central visual field.

Accordingly, in peripheral vision, it may not be perceived that light transmitted through the second regions is focused at a position that is closer to an object than the retina is, as a result of which the myopia progression suppressing effect may not be exerted.

It is conceivable to address this issue by making the lens structure different between the portion corresponding to the central visual field and the portion corresponding to the peripheral visual field. Specifically, it is conceivable to make the shape, power, or the like of the second regions different between the portion corresponding to the central visual field and the portion corresponding to the peripheral visual field, or to provide one of the portions with a stronger field curvature. However, when the lens structure is made partially different, the entire lens surface will become uneven and the appearance will be impaired. Furthermore, when the eyeball rotates, the correspondence between the distribution of the lens structure and the line of sight changes, and thus the effect may not always be sufficient.

It is an aspect of the present disclosure to provide a technique for making an eyeglass lens exert a refractive error progression suppressing effect in peripheral vision as well.

Solution to Problem

The present disclosure was devised in order to achieve the above-described object.

A first aspect of the present disclosure is directed to an eyeglass lens including: a first region formed such that light transmitted therethrough is focused at a predetermined position in an eye; and a plurality of second regions formed such that light transmitted therethrough is focused at a position defocused from the predetermined position,
  wherein the plurality of second regions have negative spherical aberration.

A second aspect of the present disclosure is directed to the eyeglass lens according to the first aspect, in which the plurality of second regions have the negative spherical aberration, and thus light perceived in peripheral vision is recognized as pseudo-focusing at a position other than the predetermined position.

A third aspect of the present disclosure is directed to the eyeglass lens according to the first or second aspect, in which the plurality of second regions are provided with spherical aberration such that an evaluation value using a Gabor function for the transmitted light in the peripheral vision has a maximum value at a position other than the predetermined position.

A fourth aspect of the present disclosure is directed to the eyeglass lens according to any one of the first to third aspects, in which the plurality of second regions are provided with spherical aberration such that an evaluation value using a Gabor function for the transmitted light in the peripheral vision has a largest value at a position other than the predetermined position.

A fifth aspect of the present disclosure is directed to the eyeglass lens according to any one of the first to fourth aspects, in which the plurality of second regions have the negative spherical aberration, and thus a ray that passes through an outermost portion of each second region and a ray transmitted through a point located inward of the outermost portion by 10% of the radius of the second region intersect each other at a position between the predetermined position and the position defocused from the predetermined position.

A sixth aspect of the present disclosure is directed to the eyeglass lens according to any one of the first to fifth aspects, in which the plurality of second regions are formed such that each second region is in a shape of an aspherical face whose curvature decreases in accordance with an increase in a distance from a center of the second region.

A seventh aspect of the present disclosure is directed to the eyeglass lens according to any one of the first to sixth aspects, in which a size and an arrangement interval of the plurality of second regions are set such that at least three of the plurality of second regions are arranged within a pupil diameter range through which the transmitted light passes and such that a figure formed by connecting reference points of the respective three second regions is an acute-angle triangle.

An eighth aspect of the present disclosure is directed to the eyeglass lens according to any one of the first to seventh aspects, in which the plurality of second regions are hexagonally arranged.

A ninth aspect of the present disclosure is directed to the eyeglass lens according to any one of the first to eighth aspects, in which the plurality of second regions have a multilayer structure, an innermost layer in the multilayer structure is a layer that functions to impart a defocus power, and an outer layer thereof is a layer that functions to impart negative spherical aberration.

Advantageous Effects of Disclosure

According to the present disclosure, it is possible to make an eyeglass lens exert a refractive error progression suppressing effect in peripheral vision as well.

DESCRIPTION OF EMBODIMENTS

Hereinafter, an embodiment of the present disclosure will be described with reference to the drawings. Note that the following description is illustrative, and the disclosure is not limited to the is illustrated aspects.

(1) Configuration of Eyeglass Lens

First, the configuration of an eyeglass lens given as an example of this embodiment will be described.

The eyeglass lens given as an example of this embodiment is a refractive error progression suppressing lens for suppressing the progression of a refractive error in an eye of a wearer of the glasses. The refractive error progression suppressing lens includes a first region having a first refractive power based on a prescription for correcting a refractive error in an eye, and a second region having a refractive power different from the first refractive power and having a function of focusing light at a position other than the retina of the eye so as to suppress the progression of a refractive error in the eye.

Refractive error progression suppressing lenses include myopia progression suppressing lenses for suppressing the myopia progression and hyperopia progression suppressing lenses for suppressing the progression of hyperopia. In the description below, a myopia progression suppressing lens will be described as an example.

Figure 1:
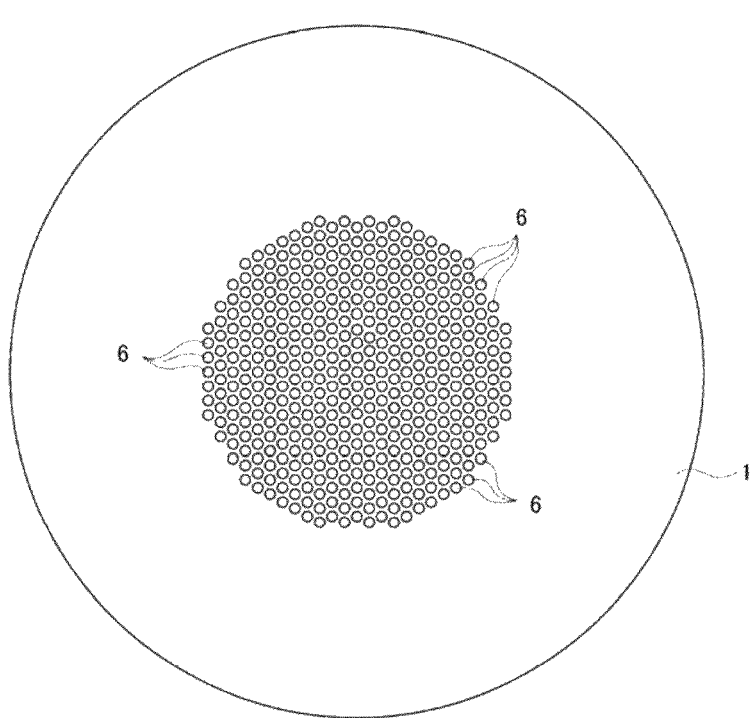
FIG. 1 is a front view showing an example of an eyeglass lens according to an embodiment of the present disclosure.
Figure 2:
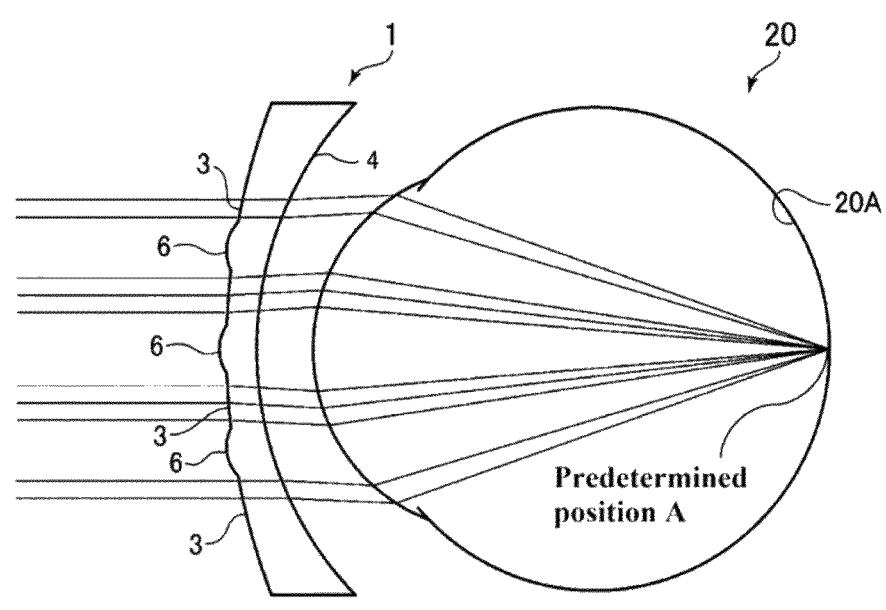
FIG. 2 is a schematic cross-sectional view (1) showing paths of light that is transmitted through the eyeglass lens shown in FIG. 1.
Figure 3:
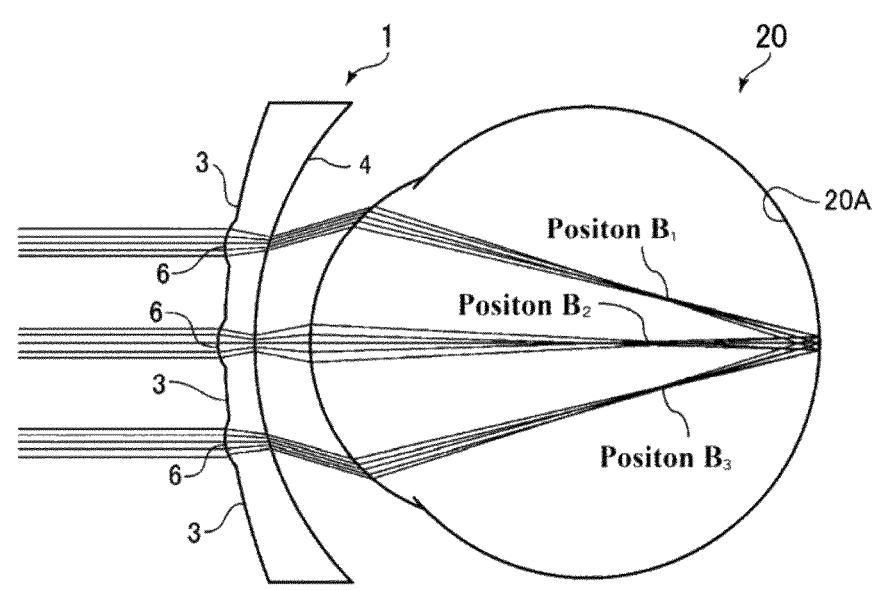
FIG. 3 is a schematic cross-sectional view (2) showing paths of light that is transmitted through the eyeglass lens shown in FIG. 1.

FIG. 1 is a front view showing an example of an eyeglass lens this embodiment. FIGS. 2 and 3 are schematic cross-sectional views showing paths of light that is transmitted through the eyeglass lens shown in FIG. 1.

Overall Configuration

An eyeglass lens 1 according to this embodiment has an object-side face and an eyeball-side face. The "object-side face" is the surface that is located on the object side when a wearer wears a pair of glasses including the eyeglass lens 1. The "eyeball-side face" is the surface that is located on the opposite side, that is, the eyeball side, when the wearer wears the pair of glasses including the eyeglass lens 1. In this embodiment, the object-side face is a convex face, and the eyeball-side face is a concave face. That is to say, the eyeglass lens 1 is a meniscus lens.

Furthermore, the eyeglass lens 1 includes a lens substrate. The lens substrate is made of, for example, a thermosetting resin material such as thiourethane, allyl, acrylic, or epithio resin. As the resin material for forming the lens substrate, other resin materials that realize a desired refractive index may be selected. The lens substrate may also be made of inorganic glass instead of resin material.

A film is formed on at least one of the object-side face and the eyeball-side face of the lens substrate. Examples of the film include a hard coat film and an antireflection film (AR film), but other types of films may also be formed in addition to these films.

A hard coat film is made of, for example, a thermoplastic or UV curable resin. The hard coat film can be formed by dipping the lens substrate in the hard coat solution or by using spin coating or other methods. This coating with the hard coat film improves the durability of the eyeglass lens 1.

An antireflection film is formed, for example, through vacuum deposition of an antireflective agent such as $ZrO_2$, $MgF_2$, or $Al_2O_3$. This coating with the antireflection film improves the visibility of an image through the eyeglass lens 1.

Convex Regions

In the eyeglass lens 1 according to this embodiment, for example, the object-side face (convex face) of the lens substrate has a plurality of convex regions that project from this face toward an object. The convex regions are each constituted by a curved face with a curvature different from that of the object-side face of the lens substrate. When the lens substrate having such convex regions is covered with a film such as a hard coat film or an antireflection film, a plurality of convex regions are formed on the face of that film as well as due to the convex regions of the lens substrate. That is to say, the object-side face (convex face) of the eyeglass lens 1 has a plurality of convex regions 6 that project from this face toward an object according to the thicknesses of the convex regions of the lens substrate and the film that covers the convex regions. Although a case in which the plurality of convex regions 6 are arranged on the object-side face is described as an example, there is no limitation thereto, and it is sufficient that the convex regions are formed on at least one of the object-side face and the eyeball-side face.

As shown in FIG. 1, the plurality of convex regions 6 are regularly arranged on the face of the eyeglass lens 1. In the drawing of this example, the plurality of convex regions 6 are arranged on part of the lens near the center, but there is no limitation thereto, and the convex regions 6 may be arranged on the entire face of the lens or circumferentially arranged around the lens center as long as the convex regions are regularly arranged.

Furthermore, the plurality of convex regions 6 are arranged in an island-like manner independently from each other (i.e., they are separated from each other without being in contact with each other). That is to say, in this embodiment, the convex regions 6 are arranged in a discrete manner (i.e., they are not continuous and are scattered in a discrete manner). Although a case in which all the convex regions 6 are arranged in an island-like manner independently from each other is described as an example, there is no limitation thereto, and the convex regions 6 may be arranged such that the outer edges of at least some adjacent regions are connected to each other or in contact with each other.

Optical Properties

With the eyeglass lens 1 having the above-described configuration, the following optical properties can be realized due to the object-side face 3 having the convex regions 6, as a result of which it is possible to suppress the progression of a refractive error such as myopia of the wearer of the glasses.

As shown in FIG. 2, light that has entered the eyeglass lens 1 from the object-side face 3 in a region in which no convex region 6 is formed (referred to a "base region" hereinafter) exits from the eyeball-side face 4 and is focused on a retina 20A of an eyeball 20. That is to say, in principle, the rays that are transmitted through the eyeglass lens 1 are focused on the retina 20A of the wearer of the glasses. In other words, the curvature of the base region of the eyeglass lens 1 is set according to the prescription of the wearer of the glasses such that a focal point is formed on the retina 20A, which is a predetermined position A. Accordingly, the base region of the eyeglass lens 1 functions as a "first region" having a first refractive power based on a prescription for correcting a refractive error in the eye of the wearer of the glasses and formed such that light transmitted through the lens is focused on the retina 20A, which is the predetermined position A. The term "focus" in this specification means that light is concentrated and forms an image, wherein the image does not necessarily need to be an aberration-free image and may have spherical aberration or astigmatism. The term "focal point" in this specification means a point recognized as a point with the maximum value for vision.

Meanwhile, as shown in FIG. 3, light that has entered the eyeglass lens 1 from the convex regions 6 exits from the eyeball-side face 4 and is focused at a position (defocused position) that is closer to an object than the retina 20A of the eyeball 20 is. That is to say, the convex regions 6 cause light that has exited from the eyeball-side face 4 to converge at a position B that is closer to an object than the predetermined position A is. The convergence position B is present as positions $B_1$, $B_2$, $B_3$, . . . $B_N$ respectively corresponding to the plurality of convex regions 6. Accordingly, each of the plurality of convex regions 6 functions as a "second region" formed such that light transmitted through the lens is focused at the position B, which is defocused from the predetermined position A. Hereinafter, the convex regions 6 functioning as the second regions are alternatively referred to as "segments".

In this manner, the eyeglass lens 1 in principle causes rays that have entered from the object-side face 3 to exit from the eyeball-side face 4 and converge at the predetermined position A, whereas, in the portion in which the segments 6 are arranged, the eyeglass lens causes rays to converge at the position B ($B_1$, $B_2$, $B_3$, . . . $B_N$) that is closer to an object than the predetermined position A is. That is to say, the eyeglass lens 1 has a function of causing rays to converge at the position B that is closer to an object, the function being different from the ray converging function for realizing the prescription of the wearer of the glasses. The eyeglass lens 1 can exert the effect of suppressing the progression of a refractive error such as myopia of the wearer of the glasses (referred to as a "myopia suppression effect" hereinafter) due to having such optical properties.

(2) Summary of Peripheral Vision

The above-described optical properties of the eyeglass lens 1 are mainly for cases in which light that has entered is transmitted through the lens to a portion corresponding to a central visual field including the fovea of the retina and is perceived by the portion corresponding to the central visual field. Note that the retina of the eyeball corresponds to the peripheral vision as well. The term "peripheral vision" herein means perceiving light at a portion corresponding to the peripheral visual field outside the central visual field.

Figure 4:
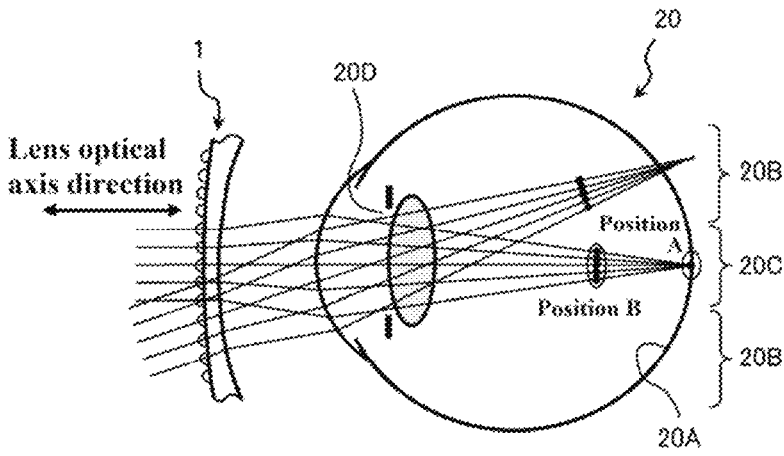
FIG. 4 is a schematic cross-sectional view showing paths of main rays of light that enter respective segments, in central and peripheral vision.

FIG. 4 is a schematic cross-sectional view showing paths of main rays of light that enter respective segments, in central and peripheral vision.

In many cases, including the example in FIG. 4, light that reaches a peripheral visual field 20B enters the eyeglass lens 1 at an angle relative to light that reaches the central visual field 20C.

The light at an angle relative to light that reaches the central visual field 20C passes through the eyeglass lens 1 and further through a pupil 20D of the eyeball 20 to the portion corresponding to the peripheral visual field 20B of the retina 20A and is perceived by the peripheral visual field 20B. The peripheral visual field 20B has a spatial resolution lower than that of the central visual field 20C. Specifically, the photoreceptor cells of the peripheral visual field 20B have only 10 to 20% of the resolution of the central visual field 20C. Accordingly, light stimuli that are used as cues to locate the focal point may be perceived differently in the peripheral visual field 20B from in the central visual field 20C.

Accordingly, in the peripheral vision, even when light converges at the position B as described above, the peripheral visual field 20B may not detect the convergence. That is to say, in the peripheral visual field 20B, light stimuli that are used as cues to locate the focal point are different from those in the central visual field 20C, and thus it may not be perceived that light transmitted through the segments 6 of the eyeglass lens 1 is focused at the position B that is closer to an object than the retina 20A is, as a result of which the myopia progression suppressing effect may not be exerted.

Hereinafter, a difference between an image perceived by the central visual field 20C and an image perceived by the peripheral visual field 20B will be described in detail.

Figure 5:
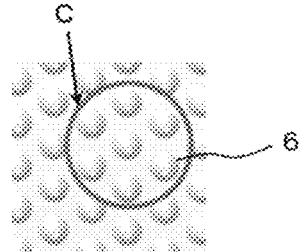
FIG. 5 is an enlarged view showing the shape and the curvature of convex regions in the eyeglass lens shown in FIG. 1.

FIG. 5 is an enlarged view showing the shape and the curvature of the segments 6 in the eyeglass lens 1.

In this example, a region C in which segments are hexagonally arranged as shown in FIG. 5 is used to describe how light transmitted through the segments 6 in the region C is perceived.

Figure 6:
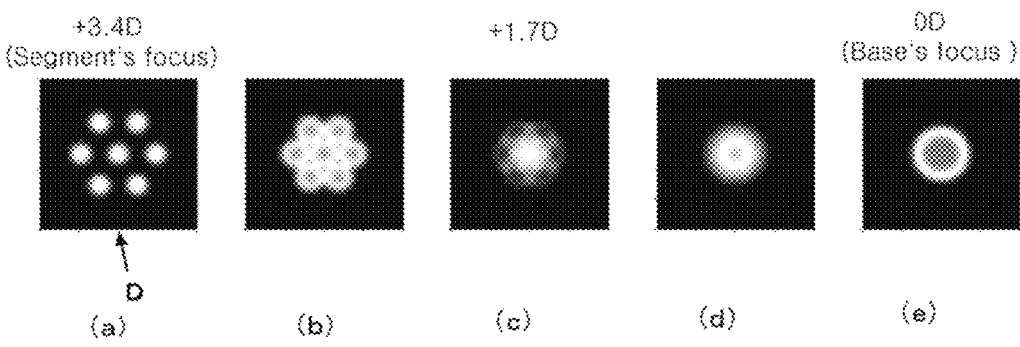
FIG. 6 is an explanatory view showing a simulated image when light that is transmitted through the convex regions shown in FIG. 5 is perceived by a central visual field of an eyeball.

FIG. 6 is an explanatory view showing a simulated image when light that is transmitted through the segments 6 of the eyeglass lens 1 is perceived by the central visual field 20C of the eyeball 20.

This drawing shows a simulation result regarding the eyeglass lens 1 in which the segments 6 are formed such that light transmitted therethrough is focused at a position B that is closer to an object than a predetermined position A is by "3.4 D (diopters)" when the predetermined position A on the retina 20A is taken as "0 D", as to how light that is transmitted through the segments 6 is perceived by the central visual field 20C at a plurality of points from 3.4 D to 0 D.

As shown in FIG. 6, according to the simulation considering the resolution of the central visual field 20C, it is seen that light transmitted through the respective segments 6 is perceived as being most focused at the position B (i.e., the position at +3.4 D), that is, the diameter of the white circles in the drawing showing the perceived state of light is the smallest at that position (see the arrow D in FIG. 6).

Figure 7:
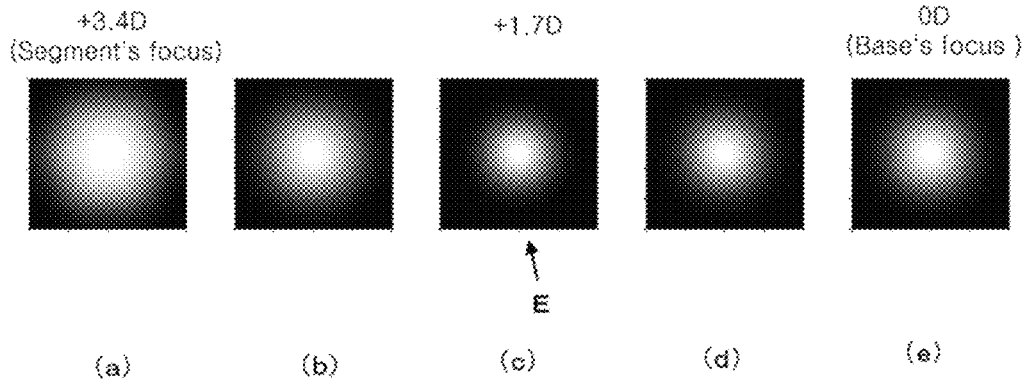
FIG. 7 is an explanatory view showing a simulated image when light that is transmitted through the convex regions shown in FIG. 5 is perceived by a peripheral visual field of an eyeball.

FIG. 7 is an explanatory view showing a simulated image when light that is transmitted through the segments 6 of the eyeglass lens 1 is perceived by the peripheral visual field 20B of the eyeball 20.

This drawing also shows a simulation result at a plurality of points from the predetermined position A (0 D) to the position B (+3.4 D) that is closer to an object than the position A is, as in the case of the central visual field 20C described above.

As shown in FIG. 7, according to the simulation considering the resolution of the peripheral visual field 20B, contrary to the case of the central visual field 20C described above, light is not perceived as being most focused at the position B (i.e., the position at +3.4 D). That is to say, it is seen that light transmitted through the respective segments 6 is not individually perceived, but perceived as one merged light portion and as blurred light overall.

As described above, the manner in which light is perceived differs between the central visual field 20C and the peripheral visual field 20B due to the difference in resolution. Accordingly, even though the segments 6 are formed so as to exert the myopia suppressing effect in the central visual field 20C, the segments alone may not be able to exert the myopia suppressing effect in peripheral vision as well.

In order to exert the myopia suppressing effect in peripheral vision as well, it is conceivable to address the above-mentioned issue by making the lens structure of the eyeglass lens 1 different between the portion corresponding to the central visual field 20C and the portion corresponding to the peripheral visual field 20B. Specifically, it is conceivable to make the shape, power, or the like of the segments 6 different between the portion corresponding to the central visual field 20C and the portion corresponding to the peripheral visual field 20B, or to provide one of the portions with a stronger field curvature. However, when the lens structure is made partially different, the entire lens surface will become uneven and the appearance will be impaired. Furthermore, when the eyeball rotates, the correspondence between the distribution of the lens structure and the line of sight changes, and thus the effect may not always be sufficient. That is to say, it is not preferable to make the lens structure different between the portion corresponding to the central visual field 20C and the portion corresponding to the peripheral visual field 20B. Furthermore, it is not preferable to impair the myopia suppressing effect in the central visual field 20C by considering peripheral vision.

Regarding this aspect, the inventor of the present application conducted a thorough investigation. As a result, the inventor came up with the following lens structure with which the myopia suppressing effect in the central visual field 20C will not be impaired and the myopia suppressing effect in peripheral vision will also be exerted to some extent.

For example, in peripheral vision, light is perceived as blurred light overall due to the difference in resolution from the central visual field 20C. That is to say, contrary to the case of the central visual field 20C, light is not perceived as being most focused at the position B (i.e., the position at +3.4 D). However, it is considered that, even when light is not perceived as being most focused at the position B, the myopia suppressing effect is exerted to some extent if light is perceived as being most focused (i.e., the diameter of the white circle in the drawing showing the perceived state of light is the smallest) (e.g., see the arrow E in FIG. 7) at a position that is closer to an object at least than the position A (i.e., the position at 0 D) is. Thus, in peripheral vision, in order to cause light to be perceived as being focused at a position that is closer to an object at least than the position A is, it is possible to use overlap between blurred images resulting from the low spatial resolution in the peripheral visual field 20B. That is to say, in peripheral vision, light transmitted through the respective segments 6 is perceived as blurred images due to the low resolution, and, if the light energy is increased by the overlapping portion of the blurred images, it is possible to allow the wearer to perceive light as if the light was focused at the overlapping portion. Hereinafter, the use of the overlap between blurred images to generate the perception of a pseudo-focusing point at a location other than the optical focal point is simply referred to as "pseudo-focusing".

In order to more effectively cause such pseudo-focusing to occur, it is sufficient that the segments have negative spherical aberration properties such that the light energy at the edges of the blurred images of the segments is higher than that at the center portions of the blurred images.

That is to say, the inventor of the present application came up with a lens structure that imparts negative spherical aberration to the plurality of segments 6 such that light perceived in peripheral vision is recognized as pseudo-focusing at a desired position (i.e., a position other than focal point A on the retina 20A), in order to exert the refractive error progression suppressing effect in peripheral vision with a low spatial resolution as well.

(3) Spherical Aberration of Segments

Hereinafter, spherical aberration of the plurality of segments 6 in the eyeglass lens 1 according to this embodiment will be described.

Spherical aberration refers to a phenomenon in which the focusing position differs in the optical axis direction according to the distance from the center of each segment 6. In particular, a phenomenon in which the position at which a ray transmitted through a position closer to the edge of the segment 6 is focused in an eye is more distant from the eyeglass lens 1 than the position at which a ray transmitted through the center portion of the segment is focused in the eye is regarded as having "negative spherical aberration".

With spherical aberration, the density of a ray emitted from the segment 6 becomes non-uniform. In particular, on the side that is more distant from the eyeglass lens 1 than the paraxial focus position, rays become dense at the edges of light fluxes and a ring-like region with high light energy appears (see FIGS. 6(d) and 6(e), for example).

With such spherical aberration, rays that are at different distances from the centers of the segments 6 may intersect each other at a point that is at a distance from the optical axis or the main rays of the segments 6. That is to say, the ring-like regions may overlap each other. In this case, a region with particularly high light energy appears in the light fluxes. In this manner, if the light energy is increased by the overlapping portion of the ring-like regions, it is possible to allow the wearer to perceive light as if the light was focused at the overlapping portion, that is, to cause pseudo-focusing to occur.

As described above, if the segments 6 have negative spherical aberration, light perceived in peripheral vision can be recognized as pseudo-focusing at a position other than the focal point position A on the retina 20A.

Forming the convex faces of the segments 6 as aspherical faces is one possible approach to impart negative spherical aberration to the segments 6. Specifically, it is possible to impart negative spherical aberration by forming each convex face in the shape of an aspherical face whose curvature decreases in accordance with an increase in the distance from the center of the segment 6.

(4) Arrangement of Segments

As described above, pseudo-focusing is caused by overlap between light fluxes of the plurality of segments 6. Accordingly, the eyeglass lens 1 preferably includes a plurality of segments 6 in the pupil range. Specifically, the size and the arrangement interval of the segments 6 are preferably set such that at least three of the plurality of segments 6 are arranged within a pupil diameter range through which transmitted light passes and such that a figure formed by connecting reference points of the respective three segments 6 is an acute-angle triangle. The reference points of the segments 6 are points serving as a reference when specifying positions at which the segments 6 are arranged. For example, in the case in which the segments 6 are each circular in plan view, center points of the respective segments 6 may be the reference points.

In order to realize this arrangement, it is most preferable that the plurality of segments 6 are hexagonally arranged (in particular, in a hexagonal close-packed arrangement).

In the eyeglass lens 1, whether or not the segments 6 cause pseudo-focusing to occur can be verified (evaluated), for example, by using the method described below.

Images are recognized in the human visual field through an action similar to the Gabor transform (see J. Daugman, "Entropy reduction and decorrelation in visual coding by oriented neural receptive fields", Trans. on Biomedical Engineering, Vol. 36, No. 1, pp. 107-114(1989).). According to this document, how the human visual field perceives light can be verified (evaluated) to some extent using the evaluation value of the Gabor function shown in Expression (1) below. In Expression (1), x is the horizontal coordinate on the retina and y is the vertical coordinate on the retina, both in mm. In this example, the Gabor function in the x direction will be described as an example, but it is also possible to use the Gabor function in the y direction or intermediate directions.

Numerical Expression 1

$$G(x, y) = \exp\left\{-\frac{x^2 + y^2}{2a^2}\right\} \cos\left(\frac{2\pi x}{a}\right)$$

In evaluation using the Gabor function, for example, the Gabor function shown in Expression (1) above is convolved with a geometric optical spot (not a spot considering the spatial resolution of the human visual field), the largest value of the results of the convolution is used as the Gabor coefficient (i.e., the evaluation value using the Gabor function), and the evaluation value thereof is used to evaluate whether or not pseudo-focusing occurred. The Gabor coefficient that is used for evaluation corresponds to the evaluation value of contrast as seen by humans. Specifically, Expression (1) above is calculated with a=0.015 in the central visual field and a=0.105 in the peripheral visual field, and the Gabor coefficient (evaluation value) is normalized to the value of 1 at the best focus position and displayed on a graph. As described in detail below, the graph may be created by plotting the distance (defocus amount, unit: diopter) between the predetermined position A on the retina and the position B at which light that is transmitted through the segments 6 is focused on the horizontal axis, and plotting the Gabor coefficient (the evaluation value using the Gabor function, unit: dimensionless quantity) on the vertical axis.

When such a graph is created, if pseudo-focusing occurred between the segments 6 in peripheral vision, the evaluation value using the Gabor function for light that is transmitted through the segments 6 will have a maximum value at a position other than the predetermined position A (0 D). Accordingly, if the evaluation value using the Gabor function for light that is transmitted through the segments 6 in peripheral vision has a maximum value at a position other than the predetermined position A (0 D) in a graph that shows results of the evaluation using the Gabor function, the eyeglass lens 1 on which the segments 6 are arranged can be said to be an eyeglass lens in which spherical aberration is imparted to the segments 6 and the segments 6 are arranged such that pseudo-focusing occurs at a position other than the predetermined position A.

The maximum value is preferably the largest value. However, the maximum value does not necessarily need to be the largest value, and, as long as the maximum value is large enough, it can be recognized as indicating pseudo-focusing even if it is not the largest value. For example, it is sufficient that the maximum value is larger than the median between the largest and smallest values.

EXAMPLES

Hereinafter, the present disclosure will be described in more detail by way of examples. The following is a description of an example and is a brief description of a comparative example thereof. Furthermore, in the example and the comparative example, results of evaluation using the Gabor function will be also described. It will be appreciated that the disclosure is not limited to the following examples.

Example

In the example, an eyeglass lens 1 was formed in which a plurality of segments 6 were arranged such that the diameter D of each segment 6 was 0.8 mm, the interval L between adjacent segments 6 was 1.05 mm, the area ratio K of the segments 6 was 0.5, and the power P that was given to the segments 6 was 3.4 D.

The segments 6 had a shape obtained by adding, to the base shape, a sag amount Z according to Expression (2) below with respect to a distance h from the segment center (where radius of curvature r=177 mm, conic term k=0, and quartic aspherical coefficient A=−8.17×10⁻⁴) and a constant term for continuously forming a boundary between the segment and the base shape.

Numerical Expression 2

$$z = \frac{\dfrac{h^3}{r}}{1 + \sqrt{1 - \dfrac{(1+k)h^2}{r^2}}} + Ah^4 \tag{2}$$

Figure 8:
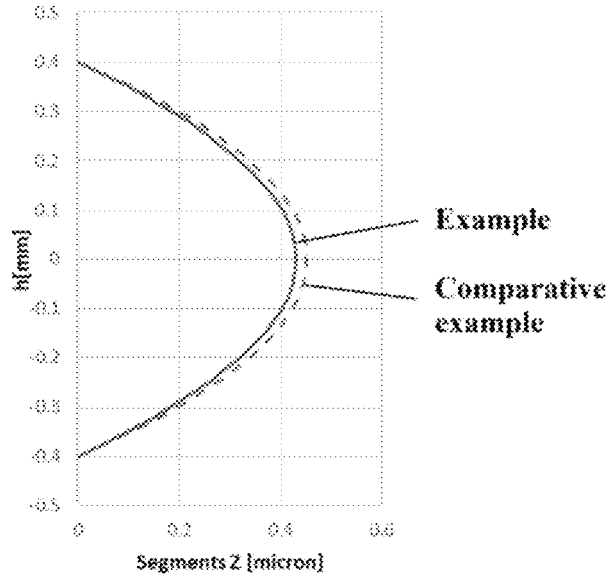
FIG. 8 is an explanatory graph showing the shapes of segments of eyeglass lenses according to an example and a comparative example of the present disclosure.

FIG. 8 is an explanatory graph showing the shape of a segment of the eyeglass lens according to the example.

In the drawing, the cross-sectional shape of a segment 6 in the eyeglass lens 1 according to the example (i.e., the shape obtained by adding the sag amount Z according to Expression (2) above to the base shape) is indicated by the solid line.

To produce the eyeglass lens, first, the lens substrate is molded using a known molding method such as injection mold polymerization. For example, a lens substrate having convex regions on at least one surface is obtained by performing molding through pouring polymerization using a molding die having a molding face with a plurality of concave portions. In this case, a molding die having a plurality of concave portions suitable for the above-described use may be used.

Then, when the lens substrate is obtained, next, a film such as a hard coat film or an antireflection film is formed on the face of the lens substrate as necessary. The film can be formed using the above-described known film-forming methods.

It is possible to obtain the eyeglass lens 1 according to the example by using the production method of this procedure.

Figure 9:
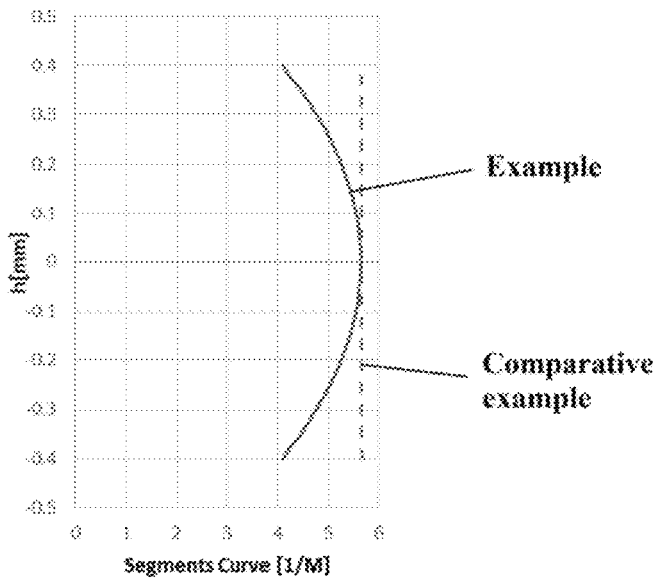
FIG. 9 is an explanatory graph showing the curvature distributions of segments of the eyeglass lenses according to the example and the comparative example of the present disclosure.

FIG. 9 is an explanatory graph showing the curvature distribution of a segment of the eyeglass lens according to the example.

In the drawing, the curvature distribution of a segment 6 in the eyeglass lens 1 according to the example (i.e., the curvature distribution of an aspherical face) is indicated by the solid line.

As shown in FIG. 9, in the eyeglass lens 1 according to the example, the curvature was 5.6 [1/M] in the vicinity of the center portion of the segment 6, while the curvature was 4.1 [1/M], that is, smaller in the vicinity of the outermost portion of the segment 6.

The segment 6 with the above-described configuration imparted negative spherical aberration, and thus a ray transmitted through the outermost portion of the segment 6 and a ray transmitted through a point located inward of the outermost portion by 10% of the radius of the segment 6 intersected each other at a position that was closer to the front side by 1.7 D than the retina 20A serving as the predetermined position A was, that is, at a middle point between the retina 20A and the focal point position B of the segment 6, which was defocused from the retina 20A.

Figure 10:
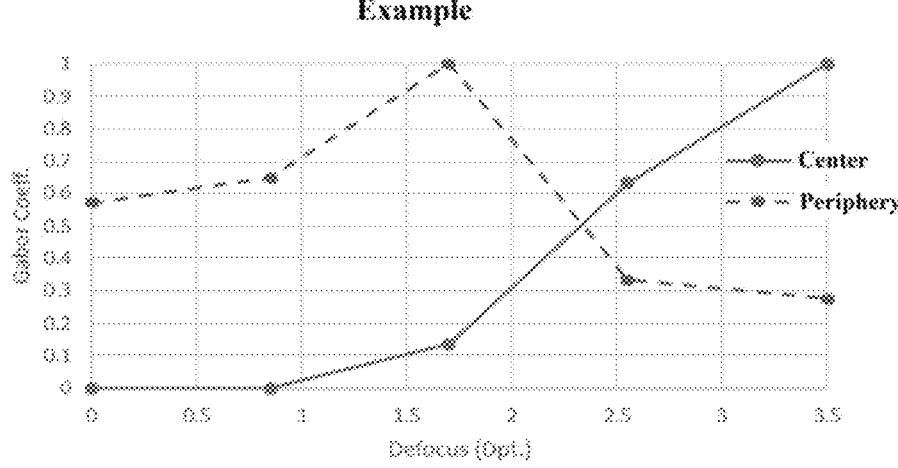
FIG. 10 is an explanatory graph showing a plot example of the Gabor coefficient (evaluation value) regarding the eyeglass lens according to the example of the present disclosure.

FIG. 10 is an explanatory graph showing a plot example of the Gabor coefficient (evaluation value) for the eyeglass lens 1 according to the example. In this graph, the horizontal axis shows the distance (defocus amount) between the predetermined position A (0 D) on the retina and the position B (3.5 D) at which light that is transmitted through the segments 6 is focused, and the vertical axis shows the Gabor coefficient (the evaluation value using the Gabor function) that is a Gabor coefficient (evaluation value) normalized to the value of 1 at the best focus position. In this graph, the Gabor coefficient calculated considering the resolution of the central visual field 20C is indicated by the solid line, and the Gabor coefficient calculated considering the resolution of the peripheral visual field 20B (i.e., the Gabor coefficient in the case of peripheral vision) is indicated by the broken line.

It is seen from the graph shown in FIG. 10 that the Gabor coefficient had a maximum value at a position at 1.7 D in the case of peripheral vision indicated by the broken line. That is to say, it was confirmed that the segments 6 of the eyeglass lens 1 caused pseudo-focusing to occur at a position other than the predetermined position A on the retina, as a result of which it is possible to realize the myopia suppressing effect without impairing the myopia suppressing effect in the central visual field 20C.

Comparative Example

Hereinafter, an eyeglass lens according to the comparative example will be briefly described. The eyeglass lens according to the comparative example had the shape obtained by changing the shape described in the foregoing example such that the quartic aspherical coefficient A in Expression (2) was changed to A=0. That is to say, the segments in the eyeglass lens according to the comparative example were in the shape of spherical faces (see the broken lines shown in FIGS. 8 and 9).

Figure 11:
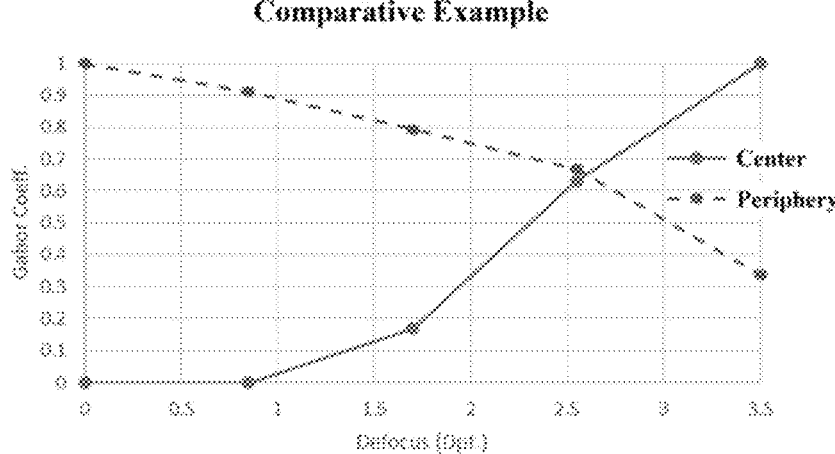
FIG. 11 is an explanatory graph showing a plot example of the Gabor coefficient (evaluation value) regarding the eyeglass lens according to the comparative example.

FIG. 11 is an explanatory graph showing a plot example of the Gabor coefficient (evaluation value) regarding the eyeglass lens according to the comparative example. In this graph as well, the horizontal axis, the vertical axis, the solid line, the broken line, and the like are as in the graph shown in FIG. 10.

It is seen from the graph shown in FIG. 11 that the Gabor coefficient had a maximum value at the predetermined position A (0 D) in the case of peripheral vision indicated by the broken line. That is to say, in the eyeglass lens according to the comparative example, the segments had no spherical aberration, and thus pseudo-focusing did not occur at a position other than the predetermined position A (0 D). Accordingly, the eyeglass lens according to Comparative Example 1 cannot exert the myopia suppressing effect in the case of peripheral vision.

MODIFIED EXAMPLES, ETC

Although the embodiments and examples of the present disclosure have been described above, the technical scope of the disclosure is not limited to the above-described exemplary disclosure, but can be modified in various ways without departing from the gist thereof.

Figure 12:
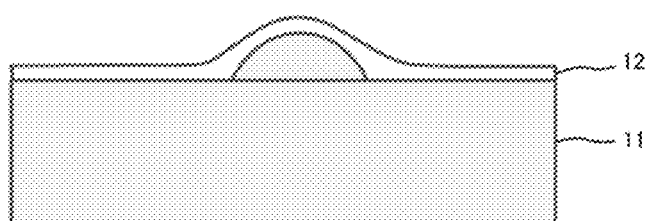
FIG. 12 is a side cross-sectional view showing a configuration example of the main portion of the eyeglass lens according to another embodiment of the present disclosure.

FIG. 12 is a side cross-sectional view showing a configuration example of the main portion of the eyeglass lens according to another embodiment.

The eyeglass lens according to the illustrated example is configured such that, in order to form each segment in the shape of an aspherical face, an aspherical layer 12 is arranged on a substrate 11 with a defocus power. For example, the substrate 11 may also be a resin lens substrate formed through injection molding, and the aspherical layer 12 may also be a hard coat film. With this configuration, it is possible to easily adjust the myopia suppressing effect according to each individual person.

That is to say, a segment having negative spherical aberration may have a multilayer structure. In that case, the innermost layer in the multilayer structure (i.e., a layer constituted by the substrate 11) is a layer that functions to impart a defocus power, and the outer layer thereof (i.e., a layer constituted by the aspherical layer 12) is a layer that functions to impart negative spherical aberration.

Furthermore, for example, in the above-described disclosure, the eyeglass lens 1 with the configuration in which the object-side face 3 has the convex regions 6 was described as an example, but the present disclosure can also be applied to eyeglass lenses with other configurations. That is to say, the disclosure can be applied not only to the lens structure in which the lens surface has the convex regions 6 but also to lens structures in which the lens surface is flat, as long as the eyeglass lens includes a first region formed such that light transmitted therethrough is focused at a predetermined position and a plurality of second regions formed such that light transmitted therethrough is focused at a defocused position different from that of the first region.

Furthermore, for example, in the above-described disclosure, the case in which the eyeglass lens is a myopia progression suppressing lens was mainly described as an example, but the present disclosure can also be applied to hyperopia progression suppressing lenses.

Furthermore, for example, in the above-described disclosure, the case in which the convex regions (segments) 6 are hexagonally arranged was mainly described as an example, but the present disclosure is not limited thereto. That is to say, the disclosure can be applied not only to the hexagonal arrangement but also to other arrangements in which convex regions (segments) are arranged so as to cause pseudo-focusing to occur in peripheral vision.

REFERENCE SIGNS LIST

1 Eyeglass lens
3 Object-side face
4 Eyeball-side face
6 Convex region (segment)
11 Substrate
12 Aspherical layer 20 Eyeball
20A Retina
20B Peripheral visual field
20C Central visual field

The invention claimed is:

1. An eyeglass lens comprising: a first region formed such that light transmitted therethrough is focused at a predetermined position in an eye; and a plurality of second regions formed such that light transmitted therethrough is focused at a position defocused from the predetermined position, wherein the plurality of second regions have negative spherical aberration such that light perceived in peripheral vision is recognized as pseudo-focusing at a position other than the predetermined position, and wherein the pseudo-focusing is caused by overlap between light fluxes of the plurality of second regions.

2. The eyeglass lens according to claim 1, wherein the plurality of second regions are provided with spherical aberration such that an evaluation value using a Gabor function for the transmitted light in the peripheral vision has a maximum value at a position other than the predetermined position.

3. The eyeglass lens according to claim 2, wherein the plurality of second regions are provided with spherical aberration such that an evaluation value using a Gabor function for the transmitted light in the peripheral vision has a largest value at a position other than the predetermined position.

4. The eyeglass lens according to claim 3, wherein the plurality of second regions have the negative spherical aberration, and thus a ray that passes through an outermost portion of each second region and a ray transmitted through a point located inward of the outermost portion by 10% of the radius of the second region intersect each other at a position between the predetermined position and the position defocused from the predetermined position.

5. The eyeglass lens according to claim 4, wherein the plurality of second regions are formed such that each second region is in a shape of an aspherical face whose curvature decreases in accordance with an increase in a distance from a center of the second region.

6. The eyeglass lens according to claim 5, wherein a size and an arrangement interval of the plurality of second regions are set such that at least three of the plurality of second regions are arranged within a pupil diameter range through which the transmitted light passes and such that a figure formed by connecting reference points of the respective three second regions is an acute-angle triangle.

7. The eyeglass lens according to claim 6, wherein the plurality of second regions are hexagonally arranged.

8. The eyeglass lens according to claim 7, wherein the plurality of second regions have a multilayer structure, an innermost layer in the multilayer structure is a layer that functions to impart a defocus power, and an outer layer thereof is a layer that functions to impart negative spherical aberration.

9. The eyeglass lens according to claim 1, wherein the plurality of second regions are provided with spherical aberration such that an evaluation value using a Gabor function for the transmitted light in the peripheral vision has a largest value at a position other than the predetermined position.

10. The eyeglass lens according to claim 1, wherein the plurality of second regions have the negative spherical aberration, and thus a ray that passes through an outermost portion of each second region and a ray transmitted through a point located inward of the outermost portion by 10% of the radius of the second region intersect each other at a position between the predetermined position and the position defocused from the predetermined position.

11. The eyeglass lens according to claim 1, wherein the plurality of second regions are formed such that each second region is in a shape of an aspherical face whose curvature decreases in accordance with an increase in a distance from a center of the second region.

12. The eyeglass lens according to claim 1, wherein a size and an arrangement interval of the plurality of second regions are set such that at least three of the plurality of second regions are arranged within a pupil diameter range through which the transmitted light passes and such that a figure formed by connecting reference points of the respective three second regions is an acute-angle triangle.

13. The eyeglass lens according to claim 1, wherein the plurality of second regions are hexagonally arranged.

14. The eyeglass lens according to claim 1,
    wherein the plurality of second regions have a multilayer structure,
    an innermost layer in the multilayer structure is a layer that functions to impart a defocus power, and
    an outer layer thereof is a layer that functions to impart negative spherical aberration.

* * * * *